Jan. 7, 1930.  H. W. PROTZELLER  1,742,370
RAIL JOINT OILER
Filed April 8, 1926    6 Sheets-Sheet 2

Inventor
Harry W. Protzeller
By
Attorney

Inventor
Harry W. Protzeller
By Arthur W. Phelan
Attorney

Patented Jan. 7, 1930

1,742,370

UNITED STATES PATENT OFFICE

HARRY W. PROTZELLER, OF EAST CHICAGO, INDIANA, ASSIGNOR TO O. F. JORDAN COMPANY, OF EAST CHICAGO, INDIANA, A CORPORATION OF INDIANA

RAIL-JOINT OILER

Application filed April 8, 1926. Serial No. 100,768.

This invention relates to improvements in rail joint oilers and it consists of the matters hereinafter described and more particularly pointed out in the appended claims.

The primary object of the invention is to provide a motor driven vehicle adapted to travel on the rails of a railroad track and to apply a spray of oil upon the splice bars or plates only of the rail joints to prevent the usual rusting and corrosion of said bars or plates and the associated bolts and nuts thereof.

A further object of the invention is to provide means in such an oiler wherein the functions of the motor are manifold, in that it propels the vehicle, provides the desired pressure for the oil being sprayed and at the same time provides the heat necessary to warm the oil to that temperature reducing it to the desired fluidity.

These objects of the invention, as well as others, together with the many advantages thereof will more fully appear as I proceed with my specification.

In general, my improved rail joint oiler includes a vehicle similar to a push car, having front and rear pairs of wheels adapted to travel on the rails of a railroad track. At the front end of the vehicle is an internal combustion engine, suitably connected by a propeller shaft and gearing with the rear axle so that the vehicle may be driven in either direction. Carried on the deck of the vehicle, are two oil supply tanks, one on each side of and extending longitudinally thereof. At each side of the vehicle, between the wheels thereof, is an electrically actuated valve, which controls the duplex spray nozzles straddling each rail and which may be swung into and out of operative position with respect to said rail. Oil is delivered under pressure from the tanks by a pump driven by the engine and said oil passes through a heater where it is initially warmed by the exhaust gases from said engine. Said exhaust gases are also delivered to said valves so that the oil is finally heated and reduced to the desired state of fluidity before it passes to the spray nozzles. Forward of each electrically controlled valve is a means which includes rail engaging rollers adapted to have a rolling supporting engagement with the inner surface of the rail heads. Included in said means, which may be swung into an inoperative position away from the rail is a contact making and breaking finger that engages the inner plate or splice bar of each rail joint as the vehicle approaches the same and closes the nozzle valve circuit as long as said finger engages the plate or splice bar, whereby oil is delivered to the nozzles under pressure and is sprayed thereby upon the inner and outer splice bars. Current for operating the spray nozzle valves is supplied from a storage battery carried by the vehicle and charged by a generator actuated from the engine which propels the vehicle.

Referring now in detail to that embodiment of the invention illustrated in the accompanying drawings: 1 indicates as a whole, a vehicle adapted to travel upon the rails 2—2 of a railroad track, the abutting end of which rails are joined together by the inner and outer splice bars 3—3 and associated bolts and nuts 4 in the manner well known.

The vehicle 1 includes side and intermediate sills 5 and 6 respectively which are cross connected in any suitable manner. Said sills are made of edgewise disposed channels, with the flanges of the side sills directed inwardly and with the flanges of the intermediate sills directed outwardly. Suitably journalled in bearings supported from said sills are front and rear axles 7 and 8 and on said axles are the usual flanged front and rear wheels 9 and 10 adapted to travel on the rails 2—2.

Figure 2:
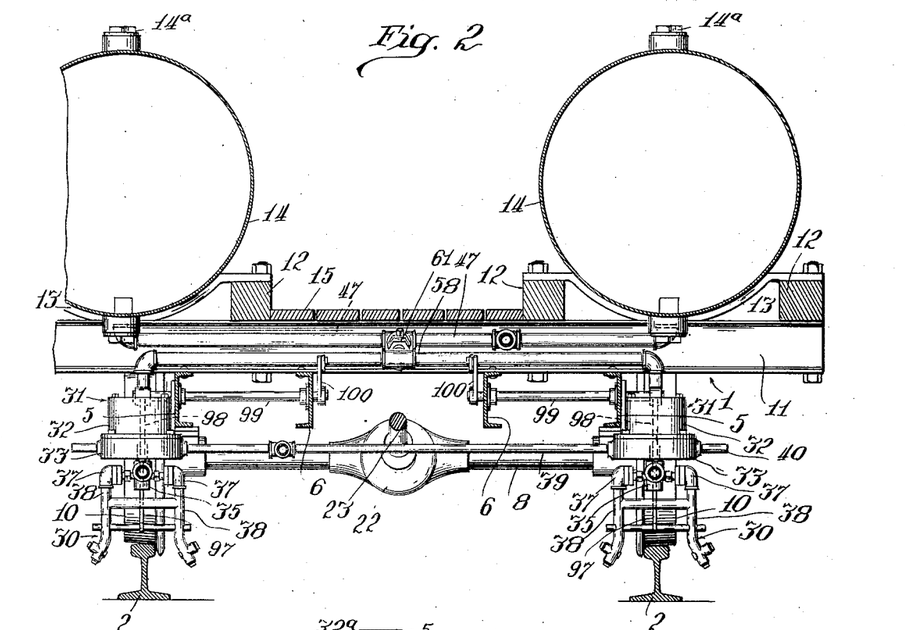
Fig. 2 is a transverse vertical section through the same as taken on the line 2—2 of Fig. 1.

Resting upon and secured to the top flanges of the side and intermediate sills and extending transversely thereof are front and rear bolsters 11—11 which are also made of channels and which project a substantial distance beyond the planes of the side sills as best shown in Fig. 2. Fixed to and extending between said bolsters are pairs of longitudinally extending beams 12—12, there being one pair of said beams at each side of the vehicle, with the beams of each pair disposed substantially at equal distance upon opposite sides of the plane of the rails. Connecting the beams of each pair thereof, are pairs of strap iron saddles 13—13 and seated upon each pair of said saddles, is a tank 14 to hold the supply of oil to be sprayed upon the rail joint plates. Thus the tanks, which are cylindrical and are disposed horizontally, extend longitudinally of the vehicle and in a manner providing a substantial balance. Between the innermost beams of each pair of beams and resting upon the bolsters is a flooring 15 upon which a seat 16 is provided for the operator. At the front and rear ends of the side sills, are front and rear pairs of stanchions, 17 and 18 which support a canopy (not shown) covering the entire vehicle. The bottom ends of the rear stanchions 18 depend below the side sills and are bent rearwardly to support a foot board 19.

Suitably mounted at the front end and centrally of the vehicle is an internal combustion engine or motor 20 and as shown herein, one of the four cylinder type. To the rear of and operatively connected to said engine is a speed gear transmission 21. On the rear axle 8 is a differential gear casing 22, the gearing of which is operatively connected to said axle. Extending between said transmission and differential is a propeller shaft 23 whereby the vehicle may be driven either forward or rearward over the rails at the desired speed. Above the engine is a gasoline tank 24 and in the plane of the front pair of stanchions 17 is a radiator 24$^a$ for said engine. The engine also drives a rotary pump 25 suitably mounted on a cross channel 26 connecting the front ends of the sills together and supported upon the engine and driven thereby is a current generator 27 which not only provides the current for engine ignition purposes but also the current to a storage battery 28 suitably carried by the vehicle and shown only in diagram in Fig. 15 and from which the valves controlling the spray nozzles are actuated as will later appear.

Figure 1:
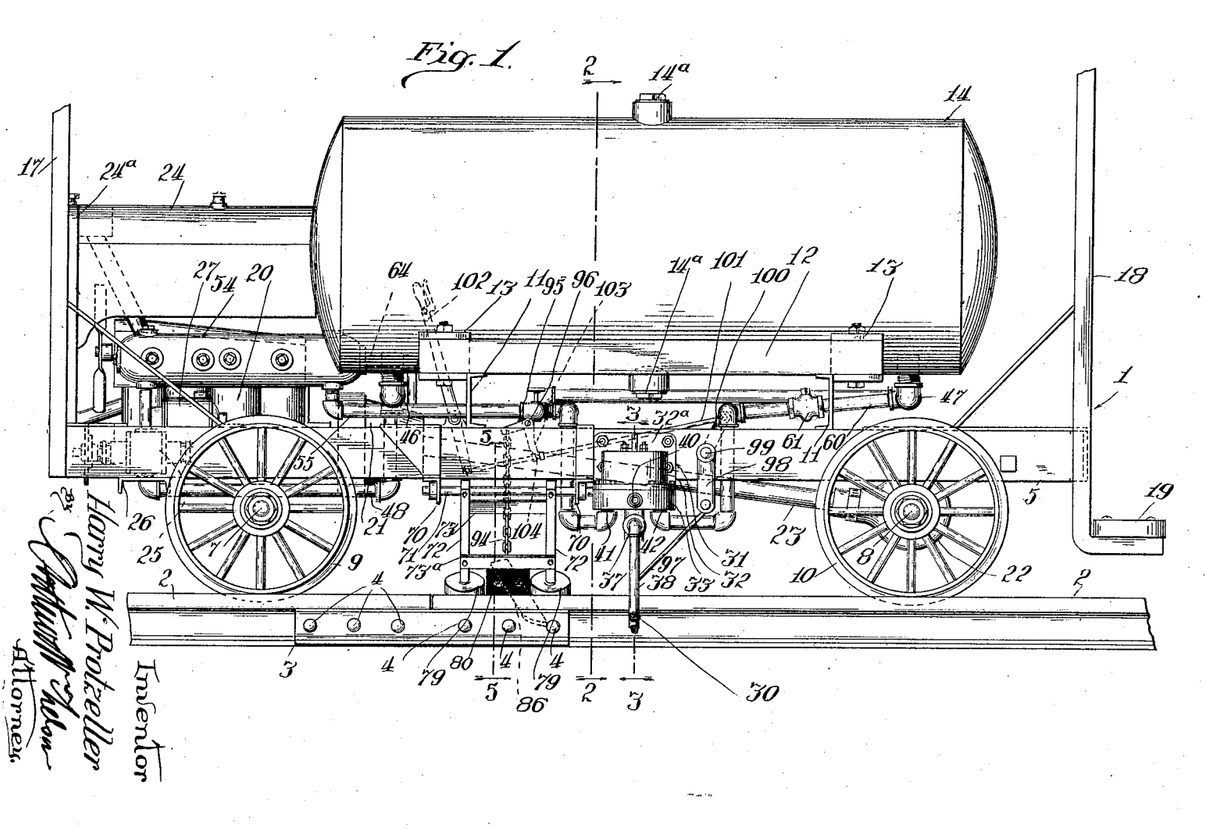
Fig. 1 is a view in side elevation of a motor driven rail joint oiler embodying my invention.
Figure 3:
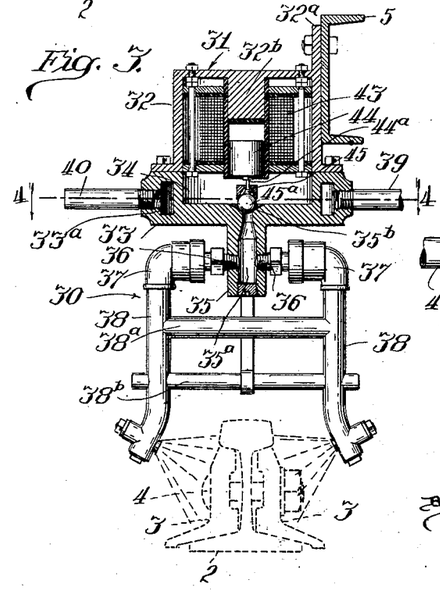
Fig. 3 is a transverse vertical section through one of the nozzle controlling, electrically actuated valves employed in my improved vehicle, the plane of the action being indicated by the line 3—3 of Fig. 1.
Figure 4:
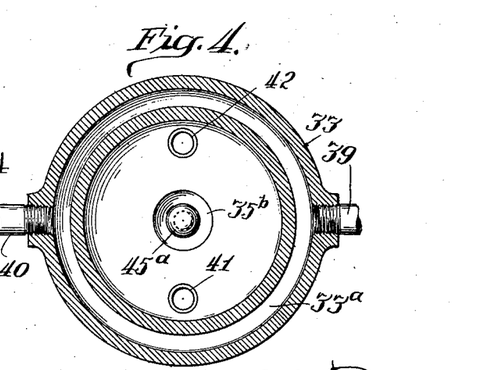
Fig. 4 is a horizontal section through said nozzle controlling valve as taken on the line 4—4 of Fig. 3.

At each side of the vehicle and between the front and rear wheels thereof is located a duplex nozzle 30 for spraying oil upon the inner and outer splice bars or plates of the rail joints as the same are approached and passed, and associated with said means is an electrically actuated valve 31 for controlling the passage of oil to said duplex nozzle. As best shown in Figs. 1 and 3 the valve 31 is mounted on the side sills and the duplex nozzle is swingably suspended from said valve. Each valve includes a downwardly opening annular casing 32, having an upright flange 32$^a$, which is bolted to the associated side sill 5. Coaxially with the top wall of the casing is a depending stud 32$^b$. The open bottom end of said casing is closed by an annular casting 33, which together with said casing defines a pressure chamber 34 for the oil to be sprayed. Depending from said casting and coaxially therewith is a tubular extension 35 closed at its bottom end and having a passageway 35$^a$ therein which opens into the chamber 34 there being a valve seat 35$^b$ at the top end of said passageway. Extending laterally from each side of the extension 35, is a nipple 36, operatively engaged by a swing joint elbow fitting 37. The duplex nozzle 30, includes laterally spaced nozzle pipes 38—38, the top ends of which engage in said elbow fittings and the bottom ends of which are bent laterally outward as best shown in Fig. 3. Said pipes 38—38 are connected together near their top ends by an equalizer pipe 38$^a$ and near their bottom ends by a cross bar 38$^b$. In the bottom end of each nozzle pipe is a spray nozzle opening 38ᶜ and associated therewith is a nozzle valve stem 38ᵈ carrying a head 38ᵉ so disposed with respect to the spray nozzle opening 38ᶜ as to permit the discharge of a conical shaped spray toward the rail joint plates as best indicated in Fig. 3. In the casting 33 is provided an annular passage 33ᵃ and threaded into said casting from opposite sides thereof so as to communicate with said passage are pipes 39 and 40, the former being connected up to other pipes as will later appear while the latter opens to atmosphere. Opening through the bottom of the casting 33 in a plane at a right angle to the pipes 39 and 40 are nipples 41 and 42 respectively by which oil may enter and leave the chamber 34.

Suitably secured in the top end of casing 32 is an annular magnetic coil 43 which partially embraces the stud 32ᵇ. Associated with said coil is a relatively heavy core 44 with a depending stem 44ᵃ. Loosely mounted on the said stem for a limited lost motion is a cage 45 carrying a ball valve 45ᵃ adapted when the coil is deenergized to engage upon the seat 35ᵇ and close off the passage 35ᵃ. When the coil is energized it attracts the core 44 and lifts the valve 45ᵃ off the seat so that the passage 35ᵃ communicates with the chamber 34.

Figure 14:
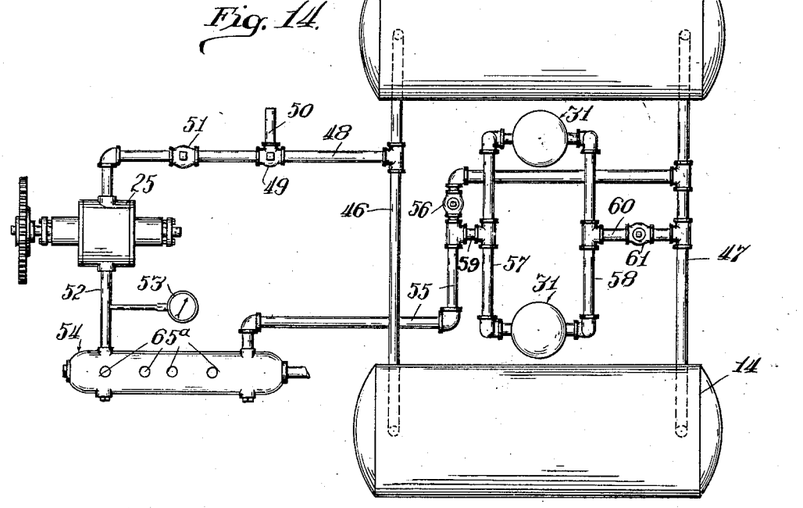
Fig. 14 is a diagrammatic plan view of the piping embodied in my improved rail joint oiler.

The piping for the passage of the oil to be sprayed, from the oil tanks 14 to the duplex nozzle heads 30 is best shown in diagram in Fig. 14, and such piping is as follows:—
The front and rear ends of both tanks 14—14 are connected together by equalizer pipes 46 and 47 respectively so that an equal level of oil is maintained in both tanks. The end of said pipes open through the bottom of said tanks and extend a distance above the same so that the bottoms of the tanks trap all dirt and sediment in the oil. Top and bottom clean out plugs are provided in each tank so that such dirt and sediment may be removed therefrom. The front equalizer pipe 46 is connected by a pipe 48 with the inlet side of the pump 25 and opening into said pipe 48 by a three way angle valve 49 is an upright pipe 50 by means of which the tanks 14—14 may be filled. In the pipe 48 between the valve 49 and pump 25 is another valve 51 by means of which the quantity of oil to the inlet side of the pump is controlled. A pipe 52 leads off from the outlet side of the pump and includes a pressure gage 53, and said pipe enters the inlet end of a heater casing 54, which is heated by the exhaust gases from the engine 20 as will be described in greater detail later. Leading from the outlet end of the heater casing 54 is a pipe 55, which is connected to the rear equalizer pipe 47 and in said pipe 55 is a by pass valve 56. The inlet nipples 41 and 42 before mentioned, of both magnetic valves 31—31 are cross connected by pipes 57 and 58 respectively. The pipe 57 is connected to the pipe 55 at a point between the heater casing 54 and by pass valve 56 by a nipple 59 while the pipe 58 is connected to the rear equalizer pipe 47 by a nipple 60, in which is a pressure regulating relief valve 61.

When the vehicle is in transport only, under its own power, and the magnetic valves 31—31 close off the passage of oil to the duplex nozzles, the by pass valve 56 is opened and the oil is then circulated from the tanks to the pump and back into the tanks, thus relieving the pump from operating against a back pressure. When the nozzles are in the operative positions shown in Figs. 1 and 3, said by pass valve is closed and the oil under pressure enters the chambers 34 of the magnetic valves 31 and each time the valve is energized, the valves 45ᵃ thereof are lifted off their respective seats and oil under pressure is delivered to the nozzles 30 to be sprayed upon the joint plates as before described. As soon as a joint is passed, the oil to the nozzles is shut off and a pressure builds up in the valve chamber 34. The valve 61 in the pipe 60 which is set to open at the desired pressure, will automatically open at the predetermined high pressure and will connect the pipes 58 and 47 thus equalizing the pressure in the piping system and relieving the pump of back pressure.

The oil employed is a low grade slow evaporating oil and therefore is somewhat heavy and thick. It may be reduced to the proper fluidity for substantial free flowing by heat and therefore the heater casing 54 is interposed in the piping or circulating system. As before stated, the exhaust gases of the motor 20 are used in the heater casing which as best shown in Figs. 10 to 13 inclusive is made as follows:—

Figure 10:
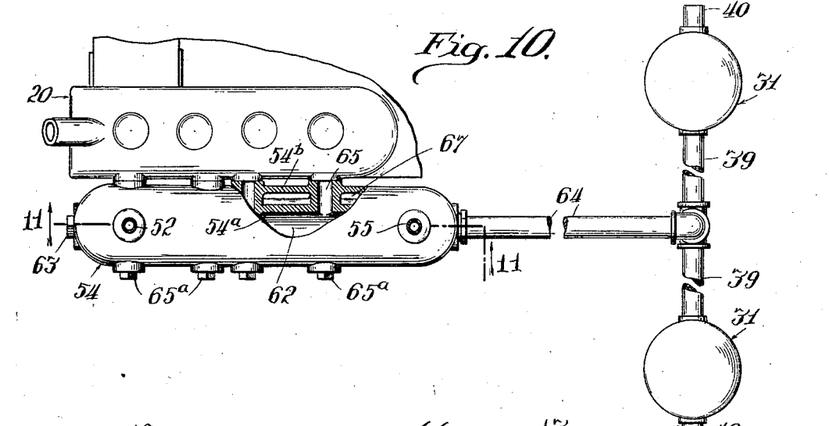
Fig. 10 is a detail view in plan elevation of a part of the motor employed in my improved rail joint oiler together with the heater using the exhaust from said motor for warming the oil on its way to the spray nozzles.
Figure 11:
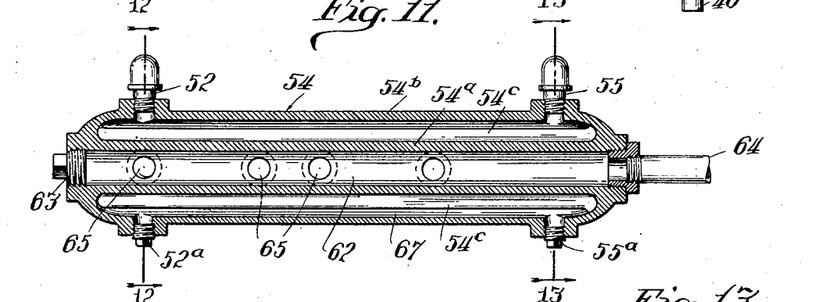
Fig. 11 is a longitudinal vertical sectional view on an enlarged scale through the oil heater as taken on the line 11—11 of Fig. 10.
Figure 12:
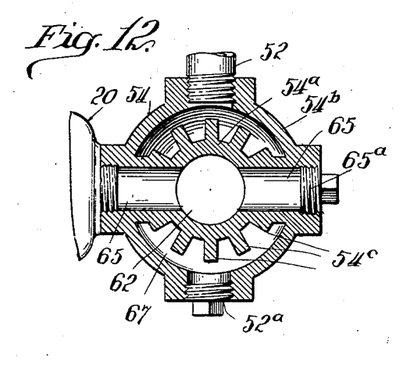
Figs. 12 and 13 are transverse vertical sectional views through the oil heater as taken on the lines 12—12 and 13—13 respectively of Fig. 11.
Figure 13:
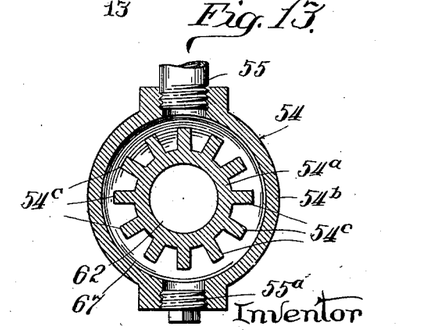

The heater casing is in the form of an elongated cylinder having inner and outer radially spaced walls 54ᵃ and 54ᵇ respectively, with the ends of the outer wall rounded to merge into the ends of the inner wall. The inner wall defines a longitudinal passageway 62 entirely through the casing which is closed at its front end by a plug 63 and has an outlet pipe 64 threaded into its inner end which pipe is connected to the pipes 39 leading into the annular passages 33ᵃ of each magnetic valve casing as best shown in Fig. 10. Extending transversely of the casing are longitudinally spaced cross ports 65—65 one for each cylinder of the engine 20, said cross ports intersecting and communicating with the passage 62. The outer end of each cross port is closed by a plug 65ᵃ while the inner end of each cross port is connected to the exhaust side of the associated cylinder by a nipple 66 as best shown in Figs. 10 and 12. The inner and outer spaced walls of the casing defines a chamber 67 into which oil is delivered from the pump 25 at one end by the pipe 52 and is discharged at the other end into the pipe 55, both of said pipes opening into the chamber at the top. Opposite the points of connection of said pipes with said chamber, the casing is provided at its bottom with cleanout openings closed by plugs 52ª and 55ª as best shown in Fig. 11. As the exhaust gases pass through the passage 62, the wall 54ª will absorb heat therefrom and which is transferred to the oil in the chamber 67. To increase the superficial area of the wall 54ª I provide thereon radially spaced longitudinally extending ribs or fins 54°.

It is apparent from the foregoing that the oil is initially heated in the casing 54 before it is delivered into the pressure chambers 34 of the magnetic valve casing 31 where it is again heated by the exhaust gases delivered into the surrounding passageways 33ª by the pipes 39 and from which it is discharged to atmosphere by the pipes 40—40.

Means are provided which automatically operate as a joint in each of the rails is approached to close an electric circuit to energize the proper magnetic valve 31 so that it opens to deliver oil under pressure to the associated duplex spray nozzle 30. There is one of such means associated with each magnetic valve and the one means operates independently of the other whereby when one valve is open the other is closed and vice versa to take care of the staggered arrangement of the joints in the rails. However as said means are the same, a description of one will suffice for both.

Figure 5:
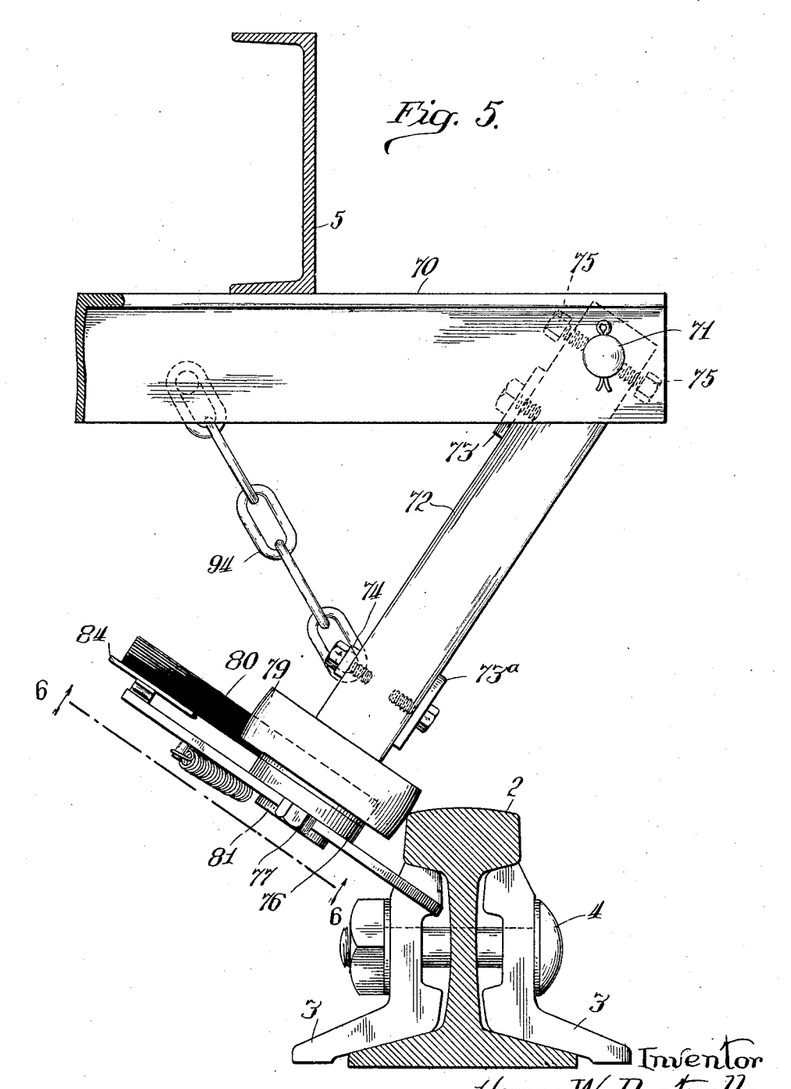
Fig. 5 is a transverse vertical sectional view on an enlarged scale as taken on the line 5—5 of Fig. 1 and illustrates the mechanism for making and breaking the nozzle valve circuit upon passing a rail joint.

Forwardly of the plane of the magnetic valves 31—31 are longitudinally spaced transverse angle bars 70—70 which are engaged with and are secured to the bottom flanges of the side and intermediate sills 5 and 6 and extend a substantial distance outwardly beyond said side sills as best shown in Fig. 5. Suitably journalled in the extreme ends of said angle bars 70, in a vertical plane beyond that of the associated rail 2, is a longitudinally extending rock shaft 71 secured against endwise displacement in any suitable manner. Depending from said shaft are front and rear arms 72 and 72. Said arms are connected together near their top and bottom ends by bars 73, 73ª and 74, the two former ones being flat bars and the latter being a cylindrical bar or rod. The said arms 72 and 72 are made of relatively heavy rectangular stock and each has a hole in its top end through which the rock shaft 71 extends and the top ends of said arms carry set screws 75 by means of which the longitudinal position of said arms on the rock shaft relative to the angle bars 70 may be easily determimned. The bottom ends of the arms are reduced in diameter and made of cylindrical cross section as best shown at 72ª in Fig. 7 and abut against a flat plate 76, bolts 77 extending through the ends of said plate into said arm ends. Journalled on each cylinder arm end 72ª is a bearing bushing 78 carried by a rail head engaging roller or disc 79. On the top side of the plate is a flat block of insulating material 80 which projects a suitable distance beyond the inner edge of the plate 76. A bolt 81 having an associated nut, passes through said plate and block to pivotally mount said block on said plate and in said block is an arcuate slot 82 (see Fig. 6) through which a clamp bolt 83 mounted on the plate 76, extends. Said slot which is relatively short, is concentric with the bolt 81 so that the angular position of the block relative to the plate may be carefully determined. On the under side of the insulation block 80 is a metallic contact plate 84 which is electrically connected to one terminal of the coil 43 of the associated magnetic valve by a conductor wire 85 as best shown in Fig. 15.

Figure 6:
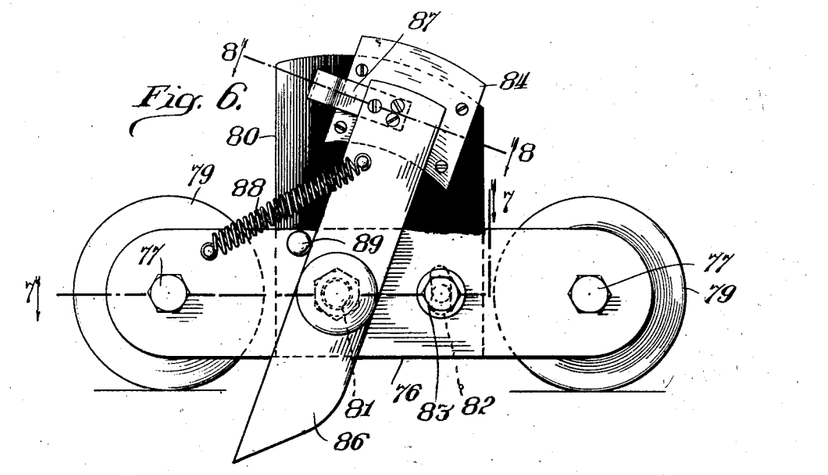
Fig. 6 is a bottom plan view of parts shown in Fig. 5 as viewed in the direction of the arrows 6—6 on said Fig. 5.
Figure 7:
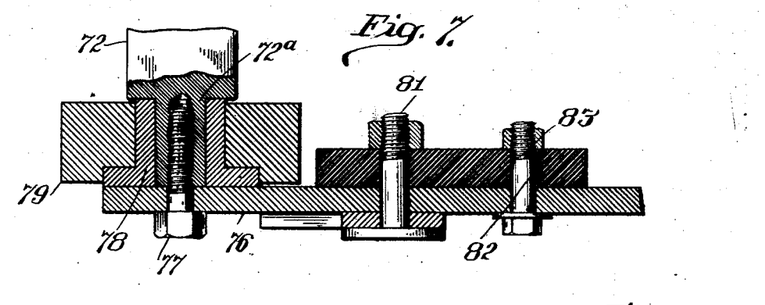
Figs. 7 and 8 are detail sectional views as taken on the lines 7—7 and 8—8 respectively of Fig. 6.
Figure 8:
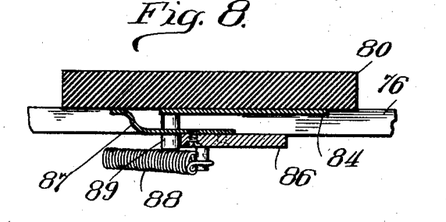
Figure 9:
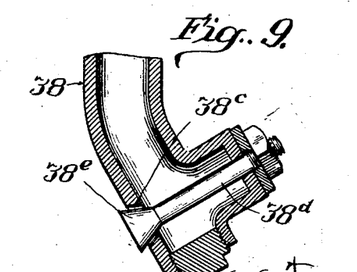
Fig. 9 is a vertical sectional view on an enlarged scale through one of the spray nozzles best shown in Figs. 2 and 3 respectively.

On the bolt 81 below the plate 76 is journalled at a point between its ends, a contact lever or member 86. The inner end of said lever underhangs the contact plate 84 and carries a contact brush 87 adapted for a wiping contact with the contact plate 84 when the lever is swung in one direction. The other end of said lever which is rounded as best shown in Fig. 6 projects a suitable distance beyond the plate 76 and when in actual operation is intended to engage the inner splice bar of the rail joint. A spring 88 so connects said lever and plate 76 that the contact brush is normally held out of engagement with the contact plate 84. A pin 89 projecting from the bottom surface of the plate 76 limits the movement of the lever 86 in one direction under the action of the spring 88. The lever 76 being mounted as described is grounded electrically to the vehicle frame.

When the arms 72 are in the position shown in Figs. 1 and 5, the rollers or discs 79 have a rolling contact along the inner top corner of the head of the associated rail and normally engage therewith under the action of gravity due to the location of the rock shaft 71. The outer end of the contact lever is so positioned that when a rail joint is approached the outer rounded end of said lever will engage the advancing end of the inner splice bar and will then ride along the same. This will cause said lever to swing about the bolt 81 against the action of the spring 88 so that the brush 87 on said lever wipes upon the contact plate 84 and closes the circuit to energize the electromagnetic valve so that oil under pressure will pass from the valve chamber 34 to the duplex nozzle to be sprayed upon the splice bars of the joint. As soon as the joint is passed, the spring 88 will operate on the lever 86 to break contact between the brush 87 and contact plate 84 thus deenergizing the magnetic valve so as to close off the passage of oil to the duplex nozzles. By loosening the set screws 75 the arms 72—72 may be adjusted longitudinally toward and away from the associated magnetic valve. Thus the position of the contact lever 86 with reference to its associated magnetic valve may be nicely determined as to when contact is to be made and broken.

Figure 15:
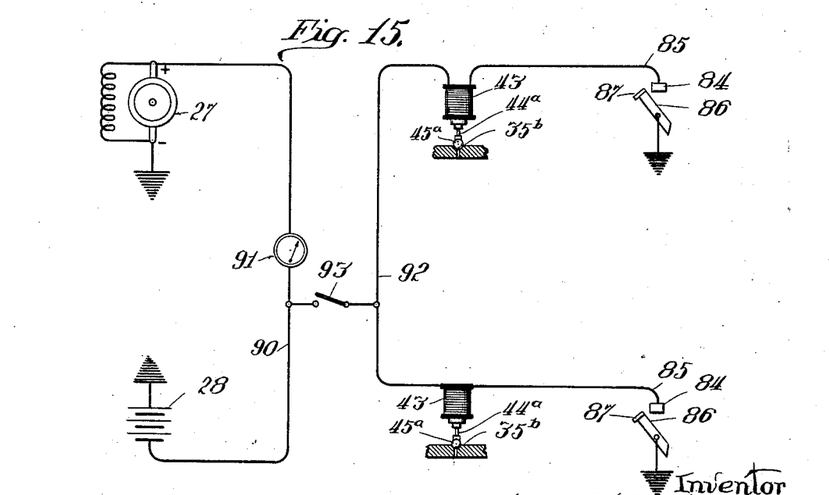
Fig. 15 is a diagrammatic view showing the electrical circuit employed in my improved rail joint oiler.

In Fig. 15 is illustrated the wiring diagram of my improved rail joint oiler. One side of both the generator 27 and battery 28 are grounded as shown in said figure while the other side of said generator and battery are connected by a conductor 90 in which is interposed an ammeter 91. The other terminals of the coils 43 are connected by a conductor 92 and a suitable switch 93 is interposed between said conductors 90 and 92. When the oiler is in operation the switch 93 is closed and when the oiler is in transport said switch is open as shown in said figure.

Each pair of arms may be swung away from the rails into an inoperative position when so desired as when the oiler is in transport. To provide such swinging movement I attach one end of a chain 94 to the arm connecting rod 74 the other end of said chain being connected to an arm 95 on a short transverse rock shaft 96 as best shown in Fig. 1. When said shaft 96 is rocked in one direction the arms 72 will swing upwardly away from the associated rail and when said shaft is rocked in the other direction, said arms will swing downwardly toward the rail under gravity until the rollers or disc 79 engage the rail head as before described.

The duplex nozzles 30 when in operative position extend vertically as shown in Fig. 1 and are capable of being swung upwardly and rearwardly of the vehicle into an inoperative position when desired, as when the rail joint oiler is in transport. To impart such movement to said nozzles, the bottom end of a link 97 is pivotally connected at one end to the cross bar 38ᵇ of the duplex nozzle while the top end of said link is connected to an arm 98 fixed to a second rock shaft 99 journalled in the sill members of the vehicle. Said shaft has a second arm 100 fixed thereto which in turn is connected by a rod 101 with the bottom end of a lever 102 located in a position on the vehicle convenient for the operator. The rock shaft 96 also has fixed to it an arm 103 the bottom end of which is forked to embrace a portion of the rod 101 between spaced shoulders 104 thereon, all as best shown in Fig. 1. Thus when the lever 102 is actuated in one direction the nozzles 30 are swung rearwardly and upwardly from the associated rail into an inoperative position and the arms 72 are simultaneously swung upwardly and inwardly away from the rail into an inoperative position, and when said lever 102 is swung in the reverse position, the said nozzle and arms are swung into an operative position with respect to the rail.

It is apparent from the foregoing description that with the contact member carrying arms and the duplex nozzles in operative position with respect to the rails, the contact member will engage the inner splice bar of the joints as they are approached and will close the circuit to the magnetic valves, and thus permit the passage of oil under pressure to the nozzles which sprays the same upon the bars or plates of the rail joint. From Fig. 3 it will be apparent that the spray issuing from the nozzles in the form of a cone will engage only on the joint bars or plates and not upon the tread portion of the rail, thus preventing the formation of rust upon said bars or plates and the nuts and bolts associated therewith. As the contact finger 86 leaves the inner bar of the rail joint, the magnetic valve is deenergized to close off the passage of oil to the associated nozzle. The contact finger being capable of yielding as before described, is quiet and positive in operation and does not operate with a jar or jolt to be transmitted to the associated mechanism. The parts thereof will clear all obstructions associated with the rails and by reason of the longitudinal adjustment of the contact carrying arms 72—72 toward and away from the associated magnetic valve, the time element required to operate the same may be determined and thus the distance ahead or behind the rail joint at which the spray engages the rail may be controlled.

The parts are all of a rugged construction and are so disposed as to be easily inspected and disassembled and assembled for repairs.

While in describing my invention, I have referred in detail to many details of construction as well as the form and arrangement of the parts thereof, the same is to be taken as by way of illustration only except as may be pointed out in the appended claims.

I claim as my invention:—

1. An apparatus of the kind described embodying therein, a spray nozzle, a reservoir for the fluid to be sprayed, a pressure generating means through which the fluid passes from the reservoir for supplying fluid under pressure to the spray nozzle, and means between said nozzle and said pressure generating means for increasing the fluidity of said fluid.

2. An apparatus of the kind described embodying therein, a spray nozzle, a reservoir for the fluid to be sprayed, a pressure generating means through which the fluid passes from the reservoir for supplying fluid under pressure to the spray nozzle, and a heating means between said nozzle and said pressure generating means for increasing the fluidity of said fluid.

3. An apparatus of the kind described embodying therein, a spray nozzle, a reservoir for the fluid to be sprayed, a pressure generating means through which the fluid passes from the reservoir for supplying fluid under pressure to the spray nozzle, and means between said nozzle and said pressure generating means for initially and finally heating the fluid.

4. An apparatus of the kind described embodying therein, a spray nozzle, a reservoir for the fluid to be sprayed, a pressure generating means through which the fluid passes from the reservoir, means providing a chamber to receive the fluid after it passes through said pressure generating means, means for heating said fluid before it is delivered to said chamber and means for again heating said fluid while in the chamber.

5. An apparatus of the kind described embodying therein, a spray nozzle, a reservoir for the fluid to be sprayed, a pressure generating means through which the fluid passes from the reservoir for supplying fluid under pressure to the spray nozzle, and an engine having an exhaust for operating said pressure generating means, said exhaust acting to heat said fluid before it is delivered to the spray nozzle.

6. An apparatus of the kind described embodying therein, a spray nozzle, a reservoir for the fluid to be sprayed, a pressure generating means through which the fluid passes from the reservoir, for supplying fluid under pressure to the spray nozzle, an engine having an exhaust for operating said pressure generating means, and means heated by the exhaust and through which said fluid passes after leaving said pressure generating means on its way to the spray nozzle.

7. An apparatus of the kind described embodying therein a spray nozzle, a reservoir for the fluid to be sprayed, a pressure generating means through which the fluid passes from the reservoir, a conduit leading from said pressure generating means to said nozzle, an engine having an exhaust for operating said pressure generating means, and means enclosing a part of said conduit and through which said exhaust passes for heating the fluid as it passes through the conduit.

8. An apparatus of the kind described embodying therein a spray nozzle, a reservoir for the fluid to be sprayed, a pressure generating means through which the fluid passes from the reservoir, a conduit leading from said pressure generating means to said nozzle, an engine having an exhaust for operating said pressure generating means, a valve in said conduit for controlling the passage of fluid to said nozzle and means associated with said conduit for imparting an initial and a final heating to the fluid therein, said final heating taking place in said valve which is adjacent but not within the spray nozzle.

9. An apparatus of the kind described embodying therein a spray nozzle, a reservoir for the fluid to be sprayed, a pressure generating means through which the fluid passes from the reservoir, a valved pressure chamber adjacent the nozzle, a conduit connecting said pressure generating means and said chamber, an engine having an exhaust for operating said pressure generating means, and means whereby a part of said conduit and said valved pressure chamber is heated by said engine exhaust.

10. An apparatus of the kind described embodying therein, a vehicle adapted to travel upon rails, an engine having an exhaust mounted on the vehicle for propelling the same, a spray nozzle carried by the vehicle for spraying a fluid upon the rails at spaced intervals, and means on the vehicle including a conduit for supplying a fluid under pressure to said nozzles and actuated from the engine, a part of said conduit being heated by the exhaust from the engine.

11. An apparatus of the kind described embodying therein, a vehicle adapted to travel upon rails, an engine having an exhaust mounted on the vehicle for propelling the same, means providing a valve controlled pressure chamber on the vehicle, a spray nozzle operatively connected thereto for spraying a fluid upon the rails at spaced intervals, and means on the vehicle including a conduit for supplying fluid under pressure to said chamber a part of said conduit and said pressure chamber being heated by the exhaust from the engine.

12. An apparatus of the kind described embodying therein, a vehicle adapted to travel upon rails, an engine on the vehicle for propelling the same, means providing a valve controlled fluid pressure chamber, means on the vehicle for supplying a fluid under pressure to said chamber and actuated from said engine, a spray nozzle associated with said chamber, and automatic means operating upon reaching and passing a joint in said rails for opening and closing the valve therein.

13. An apparatus of the kind described embodying therein, a vehicle adapted to travel upon rails, an engine on the vehicle for propelling the same, means providing a fluid pressure chamber, a spray nozzle operatively connected to said chamber, an electrically actuated valve in said chamber for controlling the passage of fluid from said chamber to said nozzle, and means carried by the vehicle and operative in passing a rail joint for energizing and deenergizing said valve for opening and closing the same.

14. An apparatus of the kind described embodying therein a vehicle adapted to travel upon rails, an engine having an exhaust mounted on the vehicle for propelling the same, a casing on the vehicle having a fluid pressure chamber therein, means actuated by the engine for supplying fluid under pressure to said chamber, a spray nozzle associated with casing for spraying fluid upon the joints in said rails, an automatic valve in said chamber for controlling the passage of fluid to the nozzle, means delivering the exhaust of said engine to said pressure chamber casing to heat the same and means operating in passing a rail joint for opening and closing said valve.

15. An apparatus of the kind described embodying therein a vehicle adapted to travel upon rails, an engine having an exhaust mounted on the vehicle for propelling the same, a casing on the vehicle having a fluid pressure chamber therein surrounded by a passageway, a pump on the vehicle actuated by said engine, a conduit connecting said pump and chamber to deliver a fluid under pressure thereto, a spray nozzle operatively connected to said casing, an automatic valve in said chamber for controlling the passage of fluid to the nozzle at spaced intervals, a heater casing enclosing a part of the conduit, and a conduit for delivering the exhaust from the engine to said heater casing and passageway in said casing having the fluid pressure chamber.

16. An apparatus of the kind described embodying therein, a spray nozzle, means for supplying a fluid under pressure thereto including an electrically actuated valve, and circuit closing means actuated by engagement with a rail joint for opening and closing the circuit to said valve.

17. An apparatus of the kind described embodying therein, a spray nozzle, means for supplying a fluid under pressure thereto including an electrically actuated valve, and circuit closing means actuated by engagement with a rail joint for opening and closing the circuit to said valve, said circuit closing means being adjustable to control the time of the opening and closing of the said electrically actuated valve.

18. An apparatus of the kind described embodying therein, a vehicle adapted to travel upon rails, a spray nozzle, means on the vehicle for delivering a fluid under pressure to said nozzle, an electrically actuated valve for controlling the passage of fluid to said nozzle, and means carried by the vehicle and including a contact finger to engage a rail joint and to open and close the circuit to said valve.

19. An apparatus of the kind described embodying therein, a vehicle adapted to travel upon rails, a spray nozzle, means on the vehicle for delivering a fluid under pressure to said nozzle, an electrically actuated valve for controlling the passage of fluid to said nozzle, and means carried by the vehicle and including a contact finger to engage a rail joint and to open and close the circuit to said valve, said last mentioned means being adjustable toward and away from the nozzle to determine the time of opening and closing said valve.

20. An apparatus of the kind described embodying therein, a vehicle adapted to travel upon rails, a casing on said vehicle providing a fluid pressure chamber, a duplex spray nozzle swingably connected to said casing for movement toward and away from one of the rails and an automatic valve in said chamber for controlling the passage of fluid from said chamber to the duplex spray nozzle.

21. An apparatus of the kind described embodying therein, a vehicle adapted to travel upon rails, a casing on said vehicle providing a fluid pressure chamber, a duplex spray nozzle including spray nozzle pipes swingably connected to said casing for movement toward and away from one of the rails, an equalizer conduit connecting said spray nozzle pipes, and an automatic valve in said chamber for controlling the passage of fluid from said chamber to said duplex spray nozzle.

22. An apparatus of the kind described, embodying therein, a vehicle adapted to travel upon rails, an engine on the vehicle for propelling the same, two fluid supply tanks on the vehicle, two equalizer pipes connecting said tanks, a pump driven by the engine and having its inlet side connected to one of said equalizer pipes, spray nozzles, one for each rail, a valve casing including a pressure chamber and automatic valve operatively connected to each spray nozzle said pressure chambers each having an inlet and an outlet, means connecting the outlet side of said pump with the inlet sides of both chambers, and means including a pressure relief valve connecting the outlets of said pressure chambers with said other tank equalizing pipe.

23. An apparatus of the kind described, embodying therein, a vehicle adapted to travel upon rails, an engine on the vehicle for propelling the same, two fluid supply tanks on the vehicle, two equalizer pipes connecting said tanks, a pump driven by the engine and having its inlet side connected to one of said equalizer pipes, spray nozzles, one for each rail, a valve casing including a pressure chamber and automatic valve operatively connected to each spray nozzle said pressure chambers each having an inlet and an outlet, means connecting the outlet side of said pump with the inlet sides of both chambers, and with said other tank equalizing pipes and including a by pass valve and means including a pressure relief valve connecting the outlets of said chambers with said other tank equalizing pipe.

In testimony whereof, I have hereunto set my hand, this 29 day of March, 1926.

HARRY W. PROTZELLER.